2,702,302
Patented Feb. 15, 1955

2,702,302

AMINE SALTS OF BIS(2-HYDROXY-3-BROMO-5-CHLOROPHENYL)SULFIDE

Richard S. Cook, Rockledge, and W E Craig, Philadelphia, Pa., assignors to Rohm & Haas Company, Philadelphia, Pa., a corporation of Delaware No Drawing. Application May 25, 1954,
Serial No. 432,319

6 Claims. (Cl. 260—567.5)

The invention is concerned with amine salts of bis(2-hydroxy-3-bromo-5-chlorophenyl)sulfide, wherein the amines have the structure $H_{3-n}NR_n$, where R is the methyl or the 2-hydroxyethyl group and $n$ is an integer from one to three and where R is tert-butyl with $n$ then having a value of one.

Many kinds of substituted phenols have been proposed to provide bactericidal activity better than that of phenol itself and to overcome some of its undesirable characteristics. For example, one or more chlorine atoms have been introduced in the phenyl nucleus of phenols, a pertinent example of which is bis(2-hydroxy-3,5-dichlorophenyl)sulfide. The dibromo analogue has also been suggested. No showing in the art has been found of a diphenylol sulfide having both chlorine and bromine in the phenyl nuclei. Yet, as shown by our data, such a compound, bis(2-hydroxy-3-bromo-5-chlorophenyl)sulfide is superior to the previously proposed compounds of this type.

Even so, this phenol as such does not show many of the properties which are desired in various kinds of applications. It is but slightly soluble in water and, therefore, requires special techniques for its dispersion in water and its practical application. It does not act as effectively against microorganisms as might be expected and, as is evident from our work reported below, it has some serious objections.

If the above bisphenol is converted to an alkali metal salt to increase solubility, the solutions thereof have a high pH and are irritating. Also, they are quite phytotoxic when applied to growing plants. The sodium salt, for example, has poor tenacity, being readily washed off surfaces to which it has been applied. In contrast the amine salts of this invention have sufficiently improved solubility to increase greatly their effectiveness against microorganisms, yet have high tenacity. Furthermore, they avoid the objectionably high pH values mentioned above. Other advantages and distinctions of the amine salts of this invention will be shown below.

We have discovered novel amine salts of bis(2-hydroxy-3-bromo-5-chlorophenyl)sulfide which have good phenol coefficients and which show excellent fungitoxicity and tenacity without developing objectionable phytotoxicity. These new amine salts are useful, for example, in soaps. The soap compositions containing small amounts of these salts give rapid and continuing action against bacteria and provide good residual action on surfaces washed therewith. These salts, for example, rapidly lower counts of bacteria in hand washing tests and maintain low counts over a long period of time. In contrast previously known phenols, including chlorine substituted polyphenols, give low counts when first used in this way with a rise in the counts over a period of time.

The amine salts of bis(2-hydroxy-3-bromo-5-chlorophenyl)sulfide herein described are also useful for controlling bacterial and fungal diseases of plants. This is particularly surprising in view of the situation that phenols in general have not heretofore been so used, without doubt because previously known materials have lacked requisite properties.

Our amine salts are those formed from one molar proportion of bis(2-hydroxy-3-bromo-5-chlorophenyl)sulfide and one molar proportion of one or more of the following amines: methylamine, dimethylamine, trimethylamine, methylhydroxyethylamine, dimethylhydroxyethylamine, hydroxyethylamine, dihydroxyethylamine, trihydroxyethylamine, and tert-butylamine. While it might be expected that two moles of amine would be required to form salts with the dihydric phenol, we have found that the stable, effective salts are those formed in the 1:1 mole ratio. We have found that only in certain instances can there be isolated salts with a 2:1 ratio, and most of these are not particularly stable. Our amine salts have the desirable effect of providing sufficient solubility with marked increase in phenol coefficient, as a measure of activity of the phenol, without requiring high alkalinity. Even with such increased activity the compounds are not rendered phytotoxic and they exhibit excellent tenacity.

The amine salts are prepared by mixing bis(2-hydroxy-3-bromo-5-chlorophenyl)sulfide and amine in the presence of a volatile inert organic solvent, in about molecular proportions. The solvent is then stripped off. The crude salt thus obtained may be used as such or may be purified, as by crystallization.

Bis(2-hydroxy-3-bromo-5-chlorophenyl)sulfide has not been found in chemical literature. It is prepared by the bromination of bis(2-hydroxy-5-chlorophenyl)sulfide, which, in turn is made from p-chlorophenol by reaction with sulfur dichloride.

In a typical preparation a solution of 5,144 parts by weight of p-chlorophenol in 12,600 parts of ethylene dichloride is stirred and thereto is slowly added 2,270 parts of sulfur dichloride. The temperature during mixing is held between 20° and 35° C. After the sulfur dichloride is added, stirring is continued fo about an hour and the reaction mixture is desirably left standing for 10 to 30 hours. A solid product precipitates. It is separated and dried. This product is bis(2-hydroxy-5-chlorophenyl)sulfide.

A suspension of 432 parts of this product is prepared in 5100 parts of carbon tetrachloride and five parts of anhydrous ferric chloride is added. The mixture is stirred and heated to 45° C. Thereto bromine is slowly added to a total of 490 parts with the reaction mixture at 45° to 50° C. The mixture is heated at reflux for a half hour and cooled to 20° C. with formation of a slurry, which is filtered. The filtrate is discarded and the crude solid product is purified by treating it in toluene solution with charcoal, the solid being taken up in 1300 parts of toluene and treated with 60 parts of charcoal and the mixture being then heated under reflux. The hot solution is filtered and cooled with formation of crystals, which are filtered off and dried at 60° C. for 12 hours. This product melts at 153–158° C. It corresponds in structure to

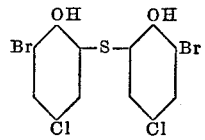

Details of typical preparations are given in the following illustrative examples, wherein parts are by weight.

Example 1

To 50 parts of bis(2-hydroxy-3-bromo-5-chlorophenyl)-sulfide suspended in 250 parts of toluene there was added monomethylamine as a gas with agitation and with maintenance of a pressure within the reaction vessel of 3 to 6 inches of mercury pressure. The total methylamine added amounted to 12.5 parts. A clear purple solution was formed while the temperature of the reaction mixture increased from 20° to 54° C. The solution was subjected to distillation under reduced pressure until a solid precipitated. It was filtered off and dried in air to give 33 parts of a solid which corresponded well in composition with

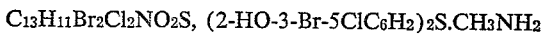

The product melted with decomposition at 179–189° C.

Example 2

To 111 parts of bis(2-hydroxy-3-bromo-5-chlorophenyl)sulfide slurried in 300 parts of toluene there was added with agitation dimethylamine gas under a pressure of three to six inches of mercury until a total of 40 parts of dimethylamine had been added. The temperature of the reaction mixture rose from 25° to 50° C. with development of a clear brown solution. It was heated under reduced pressure with stirring until 65% of the charged toluene had been removed. The residue was a brown gum which was treated with 500 parts of isoctane with conversion of residue to a white solid. This was filtered and dried. The yield was 121 parts of the mono-dimethylamine salt of bis(2-hydroxy-3-bromo-5-chlorophenyl)sulfide.

*Example 3*

A slurry was made from 50 parts of bis(2-hydroxy-3-bromo-5-chlorophenyl)sulfide and 250 parts of toluene. Into this slurry trimethylamine gas was passed with the pressure in the reaction temperature held at three to six inches of mercury. The temperature of the reaction mixture rose from 20° to 47° C. Reaction was continued until 23 parts of the amine had been added. A clear purple solution resulted. The reaction mixture was heated under reduced pressure with removal of solvent. There remained a viscous purple gum. This was treated with 600 parts of isooctane to give a slightly purplish solid. This was filtered off and air dried. It corresponded by analysis with $C_1 H_5 Br_2 Cl_2 NO_2 S$, bis(2-hydroxy-3-bromo-5-chlorophenyl)sulfide-trimethylamine salt. It melted with decomposition at 90°–95° C.

*Example 4*

To 44 parts of bis(2-hydroxy-3-bromo-5-chlorophenyl)sulfide slurried in 150 parts of benzene there was rapidly added six parts of ethanolamine. The temperature of the mixture rose to 38° C. The reaction mixture was cooled. A solid formed. It was filtered off and air dried to give 42 parts of a grayish solid which melted at 133°–138° C. and corresponded in composition to $C_{14}H_{13}Br_2Cl_2O_3S$,

(2—HO—3—Br—5ClC$_6$H$_2$)$_2$S.HOC$_2$H$_4$NH$_2$

*Example 5*

To a slurry of 40.5 parts of bis(2-hydroxy-3-bromo-5-chlorophenyl)sulfide in about 200 parts of toluene there was added 9.6 parts of diethanolamine. Heat was evolved and the solution became clear. It was stripped at reduced pressure to give a viscous oil in an amount of 54 parts. This oil was chiefly the mono-diethanolamine salt of bis(2-hydroxy-3-bromo-5-chlorophenyl)sulfide.

*Example 6*

To 37.5 parts of bis(2-hydroxy-3-bromo-5-chlorophenyl)sulfide in 100 parts of benzene there was added 12.5 parts of triethanolamine. Heat was evolved and a clear solution was formed. The solution was heated under reduced pressure to remove solvent. A residue of 48 parts of brown viscous oil was thus obtained. The oil was chiefly the mono-triethanolamine salt of bis(2-hydroxy-3-bromo-5-chlorophenyl)sulfide.

*Example 7*

A slurry was prepared of 41.7 parts of bis(2-hydroxy-3-bromo-5-chlorophenyl)sulfide in 100 parts of benzene. Thereto dimethylaminoethanol was added in an amount of 8.3 parts. Heat was evolved and a clear solution was formed. It was stripped under reduced pressure to give 50 parts of a viscous oil, which was chiefly the mono-dimethylethanolamine salt of the above phenol.

Substitution of methyldiethanolamine for the above amine leads to the formation of an oil which is chiefly the mono-amine salt of phenol.

*Example 8*

To 43 parts of bis(2-hydroxy-3-bromo-5-chlorophenyl)sulfide slurried in 100 parts of benzene tert-butylamine, tert-C$_4$H$_9$NH$_2$, was added in an amount of seven parts. Heat was evolved and a clear solution was formed. It was stripped under reduced pressure to give 50.5 parts of a grayish solid which melted at 167°–170° C. and corresponded in composition to

(2—HO—3—Br—5ClC$_6$H$_2$)$_2$S.tert—C$_4$H$_9$—NH$_2$

Standard fungitoxicity tests were made with the amine salts of this invention. In these tests spores of *Stemphylium sarcinaeforme* (formerly identified as *Macrosporium sarcinaeforme*) and of *Monilinia fructicola* (formerly identified as *Sclerotinia fructicola*) are treated on agar plates with dilutions of the compound under test. The plates are incubated and germination or lack of germination is determined at the various dilutions. Inhibition of germination of spores of *Monilinia fructicola* was complete down to 0.001% with the monodimethylamine salt of bis(2-hydroxy-3-bromo-5-chlorophenyl)sulfide and was still evident at 0.0005%. In the tests with salts from methylamine, trimethylamine, ethanolamine, diethanolamine, triethanolamine, dimethylethanolamine, methyldiethanolamineamine, and tert-butylamine inhibition of germination of spores of *Monilinia fructicola* was 100% even at 0.0005%.

By way of comparison inhibition was complete with bis-(2 - hydroxy - 3 - bromo - 5 - chlorophenyl)sulfide only to 0.01%. When this compound was converted to its sodium salt, it become effective to a concentration of 0.0005%, but was then phytotoxic. The amine salts were practically free of toxicity at low concentration and showed only a trace of phytotoxicity at concentrations of 0.1% to 1%.

In the fungitoxicity against *Stemphylium sarcinaeforme* the pure phenol, bis(2-hydroxy-3-bromo-5-chlorophenyl)sulfide, failed to inhibit germination completely even at 0.1%, the inhibition being 82% at this concentration and dropping off rapidly. The dimethylamine salt of bis(2-hydroxy-3,5-dichlorophenyl)sulfide gave 89% inhibition at 0.1% against this organism with lower controls at lower concentrations. Fungitoxcity tests with bis(2-hydroxy-3,5 - dibromophenyl)sulfide were also unsatisfactory, showing 76% inhibitions at 0.01% and then dropping off abruptly on dilution.

With amine salts of this invention 100% inhibition was obtained with all salts at 0.001% and in most cases at 0.0005%. The triethanolamine salt gave 82% inhibition at 0.0005% and the dimethylamine salt gave 87% inhibition at 0.005%.

Tenacity tests were made by treating spores of the test organisms on test plates with a 0.1% solution of the agents under test and subjecting plates to a vigorous spray of water for times up to 16 minutes. The sprayed plates were incubated and germination, if any, observed. There was complete inhibition of germination of spores of both test organisms except with the triethanolamine salt with Stemphylium where at 16 minutes inhibition was 92%, although it was complete at eight minutes. The sodium salt of the phenol began to fail within one minute with Stemphylium. The dimethylamine salt of bis(2-hydroxy-3,5-dichlorophenyl)sulfide, which gave only 89% control at 0 minute with Stemphylium dropped to 72% after one minute of spraying.

The following conclusions may be drawn from the fungitoxicity tests. The defined amine salts of bis(2-hydroxy-3-bromo-5-chlorophenyl)sulfide all showed a marked increase in fungitoxicity over the free phenol. Whereas the parent phenol has good activity only against *M. fructicola*, the amine salts give excellent results against both test organisms. In the tenacity tests the parent phenol loses effectiveness rather rapidly against *S. sarcinaeforme*. Comparison tests with bis(2-hydroxy-5-chlorophenyl)sulfide, its sodium salt, bis(2-hydroxy-3,5-dichlorophenyl)-sulfide, its dimethylamine salt, and bis(2-hydroxy-3,5-dibromophenyl)sulfide showed these to be inferior to the amine salts of bis(2-hydroxy-3-bromo-5-chlorophenyl)-sulfide, particularly against *S. sarcinaeforme*.

The sodium salt of bis(2-hydroxy-3-bromo-5-chlorophenyl)sulfide, while highly fungitoxic, is also highly phytotoxic. Yet the amine salts are apparently free of phytotoxicity at any concentration at which they would be used and are peculiarly fungitoxic. It is of particular interest that conversion of bis(2-hydroxy-3,5-dichlorophenyl)sulfide to amine salts does not produce the increases in fungitoxicity and tenacity which have been found for the amine salts of this invention.

Various amine salts and various free phenols were evaluated for the control of powdery mildew (*Erysiphe polygoni*). Bean plants were inoculated with this organism and sprayed with a range of concentrations of the compound being evaluated. Counts were made 14 days after inoculation.

When the spray contained the agent at a level of 0.5 lb. per 100 gallons, no active lesions were found on plants sprayed with salts of bis(2-hydroxy-3-bromo-5-chlorophenyl)sulfide and dimethylamine, trimethylamine, or ethanolamine. In the case of the salt of this phenol and methylamine the count was 5. and in the case of the salt of tert-butylamine was 7. The count with bis(2-hydroxy-3-bromo-5-chlorophenyl)sulfide was 75. The controls gave counts greater than 500. With bis(2-hydroxy-3,5-dichlorophenyl)sulfide the count was 54 and with bis(2-hydroxy-3,5-dibromophenyl)sulfide 112. In the cases of all three of these free phenols counts increased rapidly on dilution. Thus at 0.125 lb. per 100 gallons all of these phenols were completely ineffective, giving counts well over 500. On the other hand the effect of the amine salts of bis(2-hydroxy-3-bromo-5-chlorophenyl)sulfide was clearly good at this concentration. Some amine salts gave noticeably decreased counts at 0.062 lb. per 100 gallons and some even at 0.031 lb. per 100 gallons.

In a comparable fashion there is usually a significant improvement in phenol coefficients in going from bis(2-hydroxy-3-bromo-5-chlorophenyl)sulfide to the defined amine salts. Conventional phenol coefficient tests were made with this phenol and its amine salts and a few comparisons were also made with other halogenated phenols. For example, phenol coefficients of less than 1.1 were determined against *Salmonella typhosa* for bis(2-hydroxy-3,5-dichlorophenyl)sulfide and for bis(2-hydroxy-3,5-dibromophenyl)sulfide. Against this same organism bis(2-hydroxy-3-bromo-5-chlorophenyl)sulfide exhibited a phenol coefficient of 5.5.

Amine salts of this last phenol gave phenol coefficients against *Salmonella typhosa* as follows: methylamine salt, 22; dimethylamine salt, 10; trimethylamine salt, 17; ethanolamine salt, 17; diethanolamine salt, 50; methyldiethanolamine salt, 11; and tert-butylamine salt, 7.

Against *Micrococcus pyogenes* var. *aureus* phenol coefficients were determined as follows: for bis(2-hydroxy-3-bromo-5-chlorophenyl)sulfide, 21; for bis(2-hydroxy-3,5-dichlorophenyl)sulfide, 6; and for bis(2-hydroxy-3,5-dibromophenyl)sulfide, 12. Amine salts of bis(2-hydroxy-3-bromo-5-chlorophenyl)sulfide gave coefficients as follows: methylamine salt, 71; dimethylamine salt, 21; trimethylamine salt, 23; ethanolamine salt, 91; triethanolamine salt, 138; methyldiethanolamine salt, 31; tert-butylamine salt, 27.

Hand washing tests were made according to a standard procedure with *Sarcina lutea* being used as the test organism. Sodium oleate was used at 0.01125 and 0.0045%. The test culture was killed within one minute with a molar concentration of amine salts of this invention of $12 \times 10^{-6}$. This was at least 20 times better than results obtained with bis(2-hydroxy-3-bromo-5-chlorophenyl)sulfide itself, bis(2-hydroxy-3,5-dichlorophenyl)sulfide, its dimethylamine salt, or bis(2-hydroxy-3,5-dibromophenyl)sulfide. These data show that the amine salts of bis(2-hydroxy-3-bromo-3-chlorophenyl)sulfide are quite effective in soaps without the necessity of solubilizing this phenol by going to its highly alkaline alkali metal salts. It is of considerable interest that the amine salt of an apparently analogous phenol did not improve over the phenol.

Typical compounds of this invention were also evaluated by in vitro tests in which the lowest killing dilution was determined against several typical fungi and bacteria. Against *Candida albicans* the fungicidal dilution was 1:11,000 for almost any of the compounds of this invention. Against *Trichlorophyton mentagrophytes* fungicidal dilutions varied. For example, the dimethylamine salt of bis(2-hydroxy-3-bromo-5-chlorophenyl)sulfide had a killing dilution of 1:210,000, while the trimethylamine salt of this phenol killed this organism at 1:1,010,000. Against *Streptococcus fecalis* the tert-butylamine salt of this phenol killed at a dilution of 1:110,000, the trimethyl and the trihydroxyethylamine salts at 1:510,000, and the dimethylamine and the dimethylhydroxyethylamine salts at 1:1,010,000.

We claim:

1. Salts of bis(2-hydroxy-3-bromo-5-chlorophenyl)sulfide and amines of the structure $R_nNH_{3-n}$, where R is a member of the class consisting of the methyl, hydroxyethyl, and tert-butyl group and $n$ is an integer from one to three when R is methyl or hydroxyethyl and $n$ has a value of one when R is tert-butyl, the mole ratio of amine to said sulfide being 1:1.

2. The salt of tert-butylamine and bis(2-hydroxy-3-bromo-5-chlorophenyl)sulfide in equimolar proportions.

3. The salt of methylamine and bis(2-hydroxy-3-bromo-5-chlorophenyl)sulfide in equimolar proportions.

4. The salt of trimethylamine and bis(2-hydroxy-3-bromo-5-chlorophenyl)sulfide in equimolar proportions.

5. The salt of dimethylamine and bis(2-hydroxy-3-bromo-5-chlorophenyl)sulfide in equimolar proportions.

6. The salt of ethanolamine and bis(2-hydroxy-3-bromo-5-chlorophenyl)sulfide in equimolar proportions.

No references cited.